United States Patent
Su et al.

(10) Patent No.: US 11,869,255 B2
(45) Date of Patent: Jan. 9, 2024

(54) ANTI-COUNTERFEITING FACE DETECTION METHOD, DEVICE AND MULTI-LENS CAMERA

(71) Applicant: Hangzhou Hikvision Digital Technology Co., Ltd., Hangzhou (CN)

(72) Inventors: Xing Su, Hangzhou (CN); Jiajun Shen, Hangzhou (CN); Hui Mao, Hangzhou (CN); Shiliang Pu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 341 days.

(21) Appl. No.: 17/283,920

(22) PCT Filed: Oct. 11, 2019

(86) PCT No.: PCT/CN2019/110652
§ 371 (c)(1),
(2) Date: Apr. 8, 2021

(87) PCT Pub. No.: WO2020/073993
PCT Pub. Date: Apr. 16, 2020

(65) Prior Publication Data
US 2021/0397817 A1 Dec. 23, 2021

(30) Foreign Application Priority Data
Oct. 12, 2018 (CN) .......................... 201811192155.4

(51) Int. Cl.
*G06V 20/64* (2022.01)
*G06T 7/55* (2017.01)
(Continued)

(52) U.S. Cl.
CPC ............... *G06V 20/64* (2022.01); *G06T 7/55* (2017.01); *G06V 10/143* (2022.01); *G06V 10/60* (2022.01);
(Continued)

(58) Field of Classification Search
CPC ...... G06V 20/64; G06V 10/143; G06V 10/60; G06V 40/166; G06V 40/45; G06V 10/467;
(Continued)

(56) References Cited

U.S. PATENT DOCUMENTS

2015/0125049 A1* 5/2015 Taigman ............... G06T 3/0093
382/118
2016/0048736 A1 2/2016 Chu et al.
(Continued)

FOREIGN PATENT DOCUMENTS

| CN | 102622588 | 8/2012 |
|---|---|---|
| CN | 106407914 | 2/2017 |

(Continued)

OTHER PUBLICATIONS

Extended European Search Report issued in Corresponding European Application No. 19870709.3, dated Nov. 10, 2021.
(Continued)

*Primary Examiner* — Santiago Garcia
(74) *Attorney, Agent, or Firm* — NORTON ROSE FULBRIGHT US LLP (57) ABSTRACT

An anti-counterfeiting face detection method, device and multi-lens camera are disclosed. The anti-counterfeiting face detection method comprises: acquiring a depth image, an infrared image and an RGB image by using a TOF camera and an RGB camera; analyzing the RGB image through a preset face detection algorithm to determine an RGB face region of a face in the RGB image and position information (Continued)

of the RGB face region; determining a depth face region of the face in the depth image and an infrared face region of the face in the infrared image based on the position information of the RGB face region; determining that the face passes the detection when the depth face region, the infrared face region and the RGB face region meet corresponding preset rules respectively.

8 Claims, 7 Drawing Sheets

(51) Int. Cl.
    *G06V 40/16*     (2022.01)
    *G06V 40/40*     (2022.01)
    *H04N 23/11*     (2023.01)
    *G06V 10/60*     (2022.01)
    *G06V 10/143*     (2022.01)
    *G06V 10/46*     (2022.01)
    *G06V 10/58*     (2022.01)

(52) U.S. Cl.
    CPC ............ *G06V 40/166* (2022.01); *G06V 40/45* (2022.01); *H04N 23/11* (2023.01); *G06T 2207/10048* (2013.01); *G06T 2207/20081* (2013.01); *G06V 10/467* (2022.01); *G06V 10/58* (2022.01)

(58) Field of Classification Search
    CPC .... G06V 10/58; G06V 40/161; G06V 40/168; G06V 40/172; G06T 7/55; G06T 2207/10048; G06T 2207/20081; H04N 23/11
    See application file for complete search history.

(56) References Cited

U.S. PATENT DOCUMENTS

| | | | |
|---|---|---|---|
| 2016/0140390 A1* | 5/2016 | Ghosh | H04N 5/33 348/78 |
| 2017/0032601 A1* | 2/2017 | Zhou | G07C 9/37 |
| 2017/0345146 A1* | 11/2017 | Fan | G06V 10/143 |
| 2018/0005018 A1* | 1/2018 | Young | G06V 20/653 |
| 2019/0318156 A1* | 10/2019 | Wu | G06V 40/45 |
| 2019/0340349 A1* | 11/2019 | Kong | G06F 21/32 |

FOREIGN PATENT DOCUMENTS

| | | |
|---|---|---|
| CN | 107506752 | 12/2017 |
| CN | 107590430 | 1/2018 |
| CN | 107832677 | 3/2018 |
| CN | 108268839 | 7/2018 |
| CN | 108596061 | 9/2018 |

OTHER PUBLICATIONS

Li et al., "Face spoofing detection with local binary pattern network" *Journal of Visual Communication and Image Representation* 2018, 54, 182-192.

Sun et al. "Context Based Face Spoofing Detection Using Active Near-Infrared Images." 2016 23rd International Conference on Pattern Recognition, Dec. 4-8, 2016, Cancun Center, Cancun, Mexico, 4262-4267.

International Search Report and Written Opinion issued in Corresponding PCT Application No. PCT/CN2019/110652, dated Jan. 8, 2020 (English Translation provided).

* cited by examiner

Accurate spectra of SolarSIM-D2 under cirrus clouds

ANTI-COUNTERFEITING FACE DETECTION METHOD, DEVICE AND MULTI-LENS CAMERA

CROSS REFERENCE TO RELATED APPLICATIONS

The present application is a national phase application under 35 U.S.C. § 371 of International Application No. PCT/CN2019/110652, filed Oct. 11, 2019, which claims the benefit of priority to Chinese patent application No. 201811192155.4 filed with the China National Intellectual Property Administration on Oct. 12, 2018 and entitled "ANTI-COUNTERFEITING FACE DETECTION METHOD, DEVICE AND MULTI-LENS CAMERA", each of which are incorporated herein by reference in their entirety.

TECHNICAL FIELD

The present application relates to the technical field of image processing, and in particularly, to an anti-counterfeiting face detection method, device and multi-lens camera.

BACKGROUND

With the development of technologies such as e-commerce, face recognition has become the most promising means of biometric authentication. Although the face recognition technology has greatly improved the convenience of people's lives, its security issues have gradually attracted people's attention. In order to prevent criminals from cracking face recognition through photos, etc., the anti-counterfeiting living body face detection technology has also become a research hotspot.

In the related living body face detection technology, the detection device will issue instructions to perform random actions, such as blinking, shaking the head, or even reading a string of random numbers, and then use the camera to detect whether the user's response meets expectations. However, the user needs to perform corresponding actions to complete the detection, which results in a long detection time and a poor user experience.

SUMMARY

The embodiments of the present application aim to provide an anti-counterfeiting face detection method, device, and multi-lens camera, so as to reduce user actions, shorten detection time, and improve user experience. Specifically, the technical solutions are as follows.

In a first aspect, an embodiment of the present application provides an anti-counterfeiting face detection method, which is applied to a multi-lens camera comprising a TOF camera and an RGB camera, and includes:
  acquiring a depth image, an infrared image and an RGB image by using the TOF camera and the RGB camera;
  analyzing the RGB image through a preset face detection algorithm to determine an RGB face region of a face in the RGB image and position information of the RGB face region;
  determining a depth face region of the face in the depth image and an infrared face region of the face in the infrared image based on the position information of the RGB face region; and
  determining that the face passes the detection when the depth face region, the infrared face region and the RGB face region meet corresponding preset rules respectively.

Optionally, determining that the face passes the detection, when the depth face region, the infrared face region and the RGB face region meet corresponding preset rules respectively, includes:
  calculating a similarity between the depth face region and a reserved priori face template;
  determining a first image feature of the infrared face region, and analyzing the first image feature through a pre-trained first deep learning model to obtain an infrared analysis result;
  determining a second image feature of the RGB face region, and analyzing the second image feature through a pre-trained second deep learning model to obtain an RGB analysis result; and
  determining that the face passes the detection, when the similarity is greater than a preset similarity threshold, the infrared analysis result indicates that the face is a living body, and the RGB analysis result indicates that the face is a living body.

Optionally, calculating the similarity between the depth face region and the reserved priori face template, includes:
  determining a side view and a top view of the face based on the depth face region; and
  comparing a face depth change curve of the side view and a face depth change curve of the top view with a face depth change curve of the reserved priori face template to determine the similarity between the depth face region and the reserved priori face template.

Optionally, the first image feature is a multi-dimensional feature vector, and the first deep learning model is a first classifier, wherein determining the first image feature of the infrared face region and analyzing the first image feature through the pre-trained first deep learning model to obtain the infrared analysis result includes:
  determining a light intensity distribution of the infrared face region and a unit normal vector of each point in the infrared face region;
  calculating a reflectivity distribution of the infrared face region based on the light intensity distribution and the unit normal vector of each point;
  dividing the infrared face region into a plurality of organ regions, and determining reflectivity distribution histograms of the plurality of organ regions based on the reflectivity distribution;
  converting the reflectivity distribution histograms into a multi-dimensional feature vector; and
  analyzing the multi-dimensional feature vector through the pre-trained first classifier to obtain the infrared analysis result.

Optionally, the second image feature is an LBP (Local Binary Pattern) feature, and the second deep learning model is a second classifier, wherein determining the second image feature of the RGB face region and analyzing the second image feature through the pre-trained second deep learning model to obtain the RGB analysis result includes:
  extracting the LBP feature of the RGB face region; and
  analyzing the LBP feature through the pre-trained second classifier to obtain the RGB analysis result.

In a second aspect, an embodiment of the present application provides a multi-lens camera, which includes:
  a TOF camera, an RGB camera and a control module;
  the TOF camera is configured for acquiring a depth image and an infrared image;

the RGB camera is configured for acquiring an RGB image; and the control module is configured for analyzing the RGB image through a preset face detection algorithm to determine an RGB face region of a face in the RGB image and position information of the RGB face region; determining a depth face region of the face in the depth image and an infrared face region of the face in the infrared image based on the position information of the RGB face region; and determining that the face passes the detection when the depth face region, the infrared face region and the RGB face region meet corresponding preset rules respectively.

Optionally, in the multi-lens camera of the embodiment of the present application, determining that the face passes the detection, when the depth face region, the infrared face region and the RGB face region meet corresponding preset rules respectively, includes:

calculating a similarity between the depth face region and a reserved priori face template;

determining a first image feature of the infrared face region, and analyzing the first image feature through a pre-trained first deep learning model to obtain an infrared analysis result;

determining a second image feature of the RGB face region, and analyzing the second image feature through a pre-trained second deep learning model to obtain an RGB analysis result; and determining that the face passes the detection, when the similarity is greater than a preset similarity threshold, the infrared analysis result indicates that the face is a living body, and the RGB analysis result indicates that the face is a living body.

Optionally, in the multi-lens camera of the embodiment of the present application, calculating the similarity between the depth face region and the reserved priori face template, includes:

determining a side view and a top view of the face based on the depth face region; and calculating a similarity between a face depth change curve of the side view and a face depth change curve of the top view and face depth change curve of the reserved priori face template;

Optionally, in the multi-lens camera of the embodiment of the present application, the first image feature is a multi-dimensional feature vector, and the first deep learning model is a first classifier, wherein determining the first image feature of the infrared face region and analyzing the first image feature through the pre-trained first deep learning model to obtain the infrared analysis result includes:

determining a light intensity distribution of the infrared face region and a unit normal vector of each point in the infrared face region;

calculating a reflectivity distribution of the infrared face region based on the light intensity distribution and the unit normal vector of each point;

dividing the infrared face region into a plurality of organ regions, and determining reflectivity distribution histograms of the plurality of organ regions based on the reflectivity distribution;

converting the reflectivity distribution histograms into a multi-dimensional feature vector; and analyzing the multi-dimensional feature vector through the pre-trained first classifier to obtain the infrared analysis result.

Optionally, in the multi-lens camera of the embodiment of the present application, the second image feature is an LBP (Local Binary Pattern) feature, and the second deep learning model is a second classifier, wherein determining the second image feature of the RGB face region and analyzing the second image feature through the pre-trained second deep learning model to obtain the RGB analysis result includes:

extracting the LBP feature of the RGB face region; and analyzing the LBP feature through the pre-trained second classifier to obtain the RGB analysis result.

Optionally, in the multi-lens camera of the embodiment of the present application, the light source of the TOF camera is infrared light with a wavelength of 940 nm.

In a third aspect, an embodiment of the present application provides an anti-counterfeiting face detection device, which is located in a multi-lens camera including a TOF camera and an RGB camera, and includes:

an image acquisition module configured for acquiring a depth image, an infrared image and an RGB image by using the TOF camera and the RGB camera;

an information determination module configured for analyzing the RGB image through a preset face detection algorithm to determine an RGB face region of a face in the RGB image and position information of the RGB face region;

a region determination module configured for determining a depth face region of the face in the depth image and an infrared face region of the face in the infrared image based on the position information of the RGB face region; and a detection judgement module configured for determining that the face passes the detection when the depth face region, the infrared face region and the RGB face region meet corresponding preset rules respectively.

Optionally, the detection judgement module includes:

a similarity calculation sub-module configured for calculating a similarity between the depth face region and a reserved priori face template;

an infrared analysis sub-module configured for determining a first image feature of the infrared face region, and analyzing the first image feature through a pre-trained first deep learning model to obtain an infrared analysis result;

an RGB analysis sub-module configured for determining a second image feature of the RGB face region, and analyzing the second image feature through a pre-trained second deep learning model to obtain an RGB analysis result; and a comprehensive analysis sub-module configured for determining that the face passes the detection, when the similarity is greater than a preset similarity threshold, the infrared analysis result indicates that the face is a living body, and the RGB analysis result indicates that the face is a living body.

Optionally, the similarity calculation sub-module includes:

a view determination unit configured for determining a side view and a top view of the face based on the depth face region; and a depth comparison unit configured for comparing a face depth change curve of the side view and a face depth change curve of the top view with a face depth change curve of the reserved priori face template to determine the similarity between the depth face region and the reserved priori face template.

Optionally, the first image feature is a multi-dimensional feature vector, and the first deep learning model is a first classifier. The infrared analysis sub-module includes:

a normal vector determination unit configured for determining a light intensity distribution of the infrared face region and a unit normal vector of each point in the infrared face region;

a reflectivity determination unit configured for calculating a reflectivity distribution of the infrared face region based on the light intensity distribution and the unit normal vector of each point;

a histogram determination unit configured for dividing the infrared face region into a plurality of organ regions, and determining reflectivity distribution histograms of the plurality of organ regions based on the reflectivity distribution;

a feature vector determination unit configured for converting the reflectivity distribution histograms into a multi-dimensional feature vector; and an infrared result determination unit configured for analyzing the multi-dimensional feature vector through the pre-trained first classifier to obtain an infrared analysis result.

Optionally, the second image feature is a local binary pattern LBP feature, and the second deep learning model is a second classifier. The RGB analysis sub-module includes:

an LBP feature extraction unit configured for extracting the LBP feature of the RGB face region; and an RGB result determination unit configured for analyzing the LBP feature through the pre-trained second classifier to obtain the RGB analysis result.

Embodiments of the present application provide an anti-counterfeiting face detection method, an anti-counterfeiting face detection device and a multi-lens camera, including: acquiring a depth image, an infrared image and an RGB image by using the TOF camera and the RGB camera; analyzing the RGB image through a preset face detection algorithm to determine an RGB face region of the face in the RGB image and position information of the RGB face region; determining a depth face region of the face in the depth image and an infrared face region of the face in the infrared image based on the position information of the RGB face region; determining that the face passes the detection when the depth face region, the infrared face region and the RGB face region meet corresponding preset rules respectively. It is determined whether the face is a living body by acquiring the depth image, the infrared image and the RGB image using the TOF camera and the RGB camera, and the detection of a living body face can be completed without the cooperation of a user performing corresponding actions, which can save the detection time and provide good user experience. Through two cameras of the TOF camera and the RGB camera, information on object depth, infrared and visible light are acquired from three dimensions at the same time. When the depth face region, the infrared face region and the RGB face region meet corresponding preset rules respectively, the face is determined to pass the detection, and the detection success rate is high. It should be understood that any product or method for implementing the present application does not necessarily achieve all of the advantages described above.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application. Those skilled in the art can also obtain other drawings based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

First, technical terms are introduced:

TOF (Time of Flight, time of flight ranging method): it is a technical means to acquire a distance by calculating the flight time of light.

SVM (Support Vector Machine): it is a common method of discrimination. In the field of machine learning, it is a supervised learning model that is commonly used for pattern recognition, classification, and regression analysis.

RGB-IR: it is a binocular camera consisting of an RGB (Red Green Blue) band camera and an IR (Infrared Radiation) band camera.

Multi-spectral: it is a common abbreviation for multi-spectral imaging technology, which refers to a spectral imaging technology with a spectral resolution having an order of magnitude of $\Delta\lambda/\lambda=0.1$. This technology generally has only a few bands in the visible and near-infrared regions. Corresponding to the multi-spectral imaging technology are a high-spectral technology and a hyper-spectral technology, and the difference between these two technologies lies in the spectral resolution, wherein the latter has a higher resolution.

Depth camera: it acquires a scene image. The value of each pixel in the image represents a distance from an object to the camera in the scene.

Infrared camera: it can measure the intensity of infrared light emitted or reflected by an object in a scene and output an image.

Camera intrinsic parameters: these are the parameters related to the characteristics of the camera itself, such as the focal length of the camera, the position of the main point, etc.

Camera extrinsic parameters: these are the parameters in the world coordinate system, such as the camera's position and rotation direction, etc.

In living body face detection related technology, the detection device will issue random action instructions, and then use the camera to detect whether the user's response meets expectations. The user needs to perform corresponding actions to complete the detection, which results in a long detection time and a poor user experience. In view of this, embodiments of the present application provide an anti-counterfeiting face detection method (see FIG. 1), which is applied to a multi-lens camera including a TOF camera and an RGB camera, and includes the followings.

Figure 1:
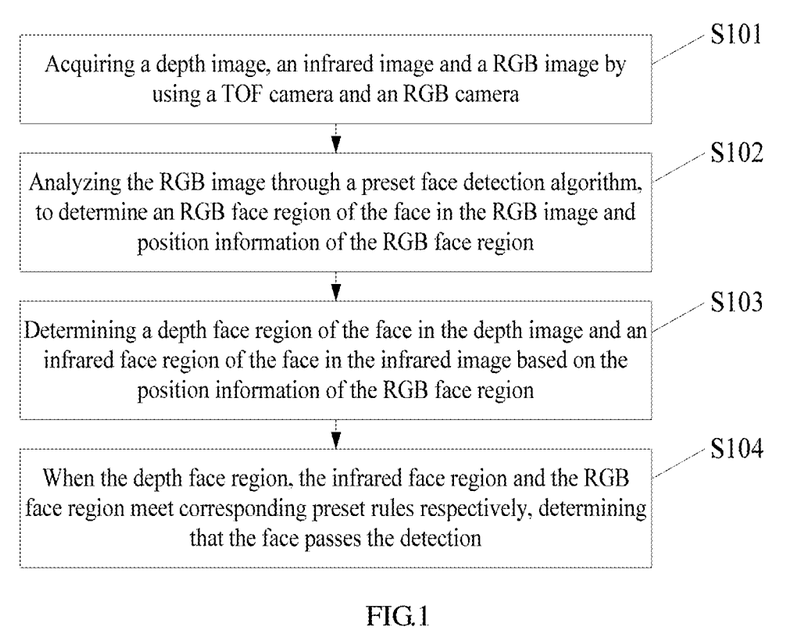
FIG. 1 is a first schematic flow chart of an anti-counterfeiting face detection method according to an embodiment of the present application.

At S101, a depth image, an infrared image and an RGB image are acquired by using the TOF camera and the RGB camera.

The anti-counterfeiting face detection method in the embodiment of the present application can be implemented by a detection system, which is any system that can implement the anti-counterfeiting face detection method in the embodiment of the present application.

For example, the detection system may be a device including a processor, a memory, a communication interface and a bus. The processor, memory and communication interface are connected and communicated with each other through the bus. The memory stores executable program codes. The processor runs a program corresponding to the executable program codes by reading the executable program codes stored in the memory, so as to execute the anti-counterfeiting face detection method in the embodiment of the present application. Optionally, the device may specifically be a multi-lens camera.

The detection system may also be an application program, which is configured for performing the anti-counterfeiting face detection method in the embodiment of the present application when being executed.

The detection system may also be a storage medium for storing the executable program codes, which are used for performing the anti-counterfeiting face detection method in the embodiment of the present application.

The TOF camera is configured for acquiring a depth image and an infrared image, and the RGB camera is configured for acquiring an RGB image. The infrared image in the embodiment of the present application is a confidence image, that is, a brightness image of infrared rays with a specified wavelength acquired by the TOF camera. Optionally, the light source of the TOF camera has a band of 940 nm and a resolution of 320×240 or higher. The resolution of the RGB camera is 640×480 or higher. The installation baseline distance between the TOF camera and the RGB camera is less than 2 cm. The detection system acquires the depth image, the infrared image and the RGB image acquired by the TOF camera and the RGB camera.

At S102, the RGB image is analyzed through a preset face detection algorithm to determine an RGB face region of a face in the RGB image and position information of the RGB face region.

The preset face detection algorithm may be any object detection algorithm for face detection, such as a face detection model based on histogram coarse segmentation and singular value features, face detection based on the AdaBoost algorithm, a face detection model based on structure features of two eyes in a face or other face detection algorithms based on deep learning, etc. The detection system determines the region of the face in the RGB image, that is, the RGB face region, and determines the position information of the RGB face region, such as the coordinates of the RGB face region, through a preset face detection algorithm.

Optionally, if the RGB face region is not detected in the RGB image, it is determined that the face detection fails, that is, no living body face is included.

At S103, a depth face region of the face in the depth image and an infrared face region of the face in the infrared image are determined based on the position information of the RGB face region.

The depth image and the infrared image are acquired by the TOF camera. The RGB image is acquired by the RGB camera. The depth image, the infrared image and the RGB image are images acquired at the same time. Due to a difference in the field of view between the TOF camera and the RGB camera, registration of positions is required when performing position mapping on the images acquired by the two cameras. Camera intrinsic parameters and camera extrinsic parameters of the multi-lens camera are acquired, and the difference in the field of view between the TOF camera and the RGB camera is calculated to determine corresponding positions of the RGB face region in the depth image and in the infrared image. Both the depth image and the infrared image are acquired by TOF camera, so that the position of the depth face region in the depth image is the same as the position of the infrared face region in the infrared image.

Specifically, the position information of the RGB face region is the coordinate region of the RGB face region, which can be converted into a coordinate region in the depth image and a coordinate region in the infrared image through affine transformation, based on the camera intrinsic parameters and the camera extrinsic parameters of the multi-lens camera, to determine the depth face region and the infrared face region.

At S104, it is determined that the face passes the detection when the depth face region, the infrared face region and the RGB face region meet corresponding preset rules respectively.

When the detection system determines that the depth face region, the infrared face region, and the RGB face region meet corresponding preset rules respectively, it determines that the face is a living body, and the face passes the detection. In an embodiment of the present application, it can be determined in parallel whether the depth face region, the infrared face region, and the RGB face region meet corresponding preset rules respectively. If one or more of the depth face region, the infrared face region, and the RGB face region do not meet corresponding preset rules respectively, it is determined that the face is a non-living body, and the face fails to pass the detection. It can be determined in any order whether the depth face region, the infrared face region, and the RGB face region meet corresponding preset rules respectively. When one of the depth face region, the infrared face region, and the RGB face region does not meet its respective preset rule, it can be directly determined that the face is a non-living body, and the face fails to pass the detection without any determination on the remaining ones. Exemplarily, the process of determining whether a face passes the detection may be a process of determining whether the face is a living body.

In the embodiment of the present application, whether the face is a living body is determined by acquiring the depth image, the infrared image and the RGB image using the TOF camera and the RGB camera, and the living body face detection can be completed without the cooperation of a user performing corresponding actions, which can save the detection time and provide good user experience. Through these two cameras of the TOF camera and the RGB camera, information on object depth, infrared and visible light are acquired from three dimensions at the same time. When the depth face region, the infrared face region and the RGB face region meet corresponding preset rules respectively, the face is determined to pass the detection, and the detection success rate is high.

Figure 2:
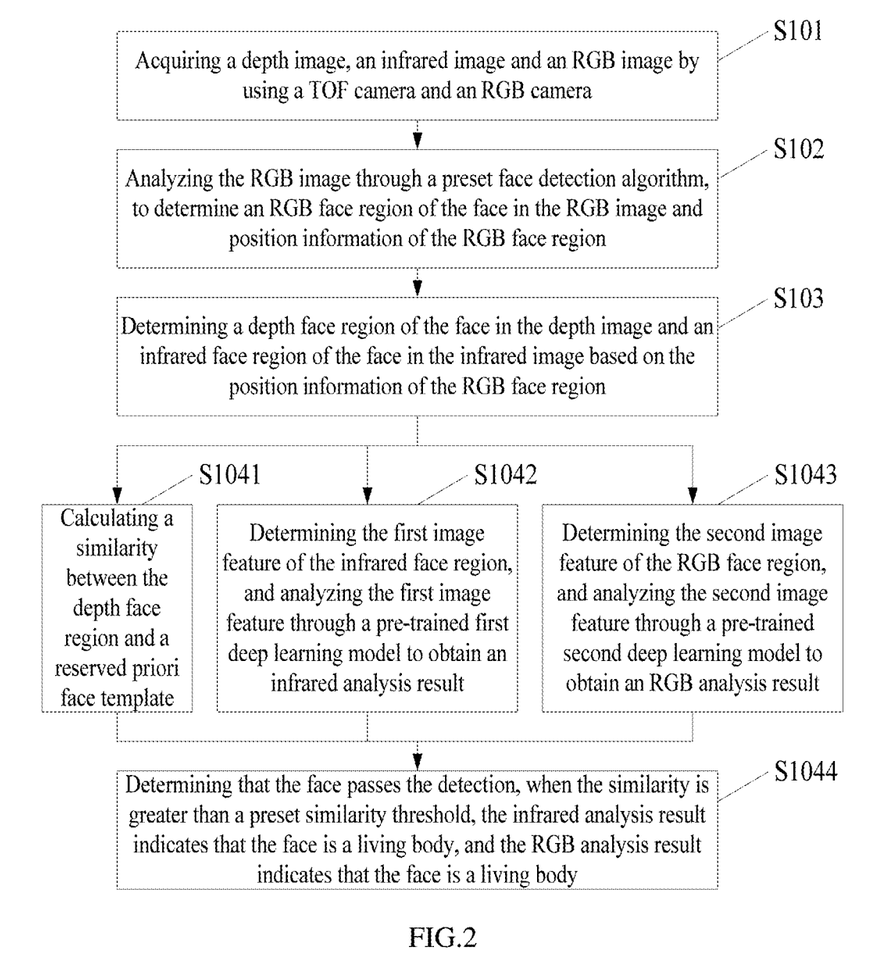
FIG. 2 is a second schematic flow chart of the anti-counterfeiting face detection method according to an embodiment of the present application.

Optionally, see FIG. 2, determining that the face passes the detection, when the depth face region, the infrared face region and the RGB face region meet corresponding preset rules respectively, includes the followings.

At S1041, a similarity between the depth face region and a reserved priori face template is calculated.

The reserved priori face template is a depth information template of a real face inputted in advance. The detection system calculates a similarity between the depth information of the depth face region and the depth information of the reserved priori face template.

At S1042, a first image feature of the infrared face region is determined, and is analyzed through a pre-trained first deep learning model to obtain an infrared analysis result.

The infrared analysis result may be that the face is a living body or the face is a non-living body.

At S1043, a second image feature of the RGB face region is determined, and is analyzed through a pre-trained second deep learning model to obtain an RGB analysis result.

The RGB analysis result may be that the face is a living body or the face is a non-living body.

At S1044, it is determined that the face passes the detection, when the similarity is greater than a preset similarity threshold, the infrared analysis result indicates that the face is a living body, and the RGB analysis result indicates that the face is a living body.

The preset similarity threshold is set according to actual conditions, for example set as 85%, 90%, or 95%. If the similarity between the depth face region and the reserved priori face template is greater than the preset similarity threshold, it is indicated that the face is a living body.

In the embodiment of the present application, it is determined that the face passes the detection, when the depth face region, the infrared face region, and the RGB face region all indicate that the face is a living body, which increases the accuracy of living body face detection.

Optionally, calculating the similarity between the depth face region and the reserved priori face template includes the followings.

At step 1, a side view and a top view of the face is determined based on the depth face region.

The detection system acquires a side view and a top view of the face based on depths of positions in the depth face region.

At step 2, a face depth change curve of the side view and a face depth change curve of the top view are compared with a face depth change curve of the reserved priori face template to determine the similarity between the depth face region and the reserved priori face template.

The detection system compares the face depth change curve of the side view and the face depth change curve of the top view with the face depth change curve of the reserved priori face template to calculate the similarity between the depth face region and the reserved priori face template. For example, the similarity between the depth face region and the reserved priori face template is calculated according to a formula aX+bY=Z, wherein a and b are preset coefficients, and a+b=1; Z is the similarity between the depth face region and the reserved priori face template; X is the similarity between the face depth change curve of the side view of the face in the depth face region and the face depth change curve of the side view of the face of the reserved priori face template; Y is the similarity between the face depth change curve of the top view of the face in the depth face region and the face depth change curve of the top view of the face of the reserved priori face template.

In the embodiment of the present application, two dimensional cross-validating is implemented by comparing the face depth change curve of the side view of the face and the face depth change curve of the top view of the face with the face depth change curve of the reserved priori face template, which avoids photo distortion to deceive the depth detection of key points, thus increasing the accuracy of living body face detection.

Optionally, the first image feature is a multi-dimensional feature vector, and the first deep learning model is a first classifier, wherein determining the first image feature of the infrared face region, and analyzing the first image feature through the pre-trained first deep learning model to obtain the infrared analysis result includes:

At Step 1, a light intensity distribution of the infrared face region and a unit normal vector of each point in the infrared face region are determined.

The detection system calculates the unit normal vector of each point (pixel), that is, the unit normal vector of each point in the infrared face region based on the depth information of the depth face region. The detection system acquires a brightness value of each pixel in the infrared face region, that is, the light intensity distribution.

At Step 2, a reflectivity distribution of the infrared face region is calculated based on the light intensity distribution and the unit normal vector of each point.

For example, the detection system calculates the reflectivity distribution of the infrared face region according to the following formula:

$$\gamma_{(x,y)} = \frac{I_{(x,y)}}{I_{std}(d)\cos\langle \vec{n}_{(x,y)}, \vec{v}\rangle} = \frac{I_{(x,y)}|\vec{n}_{(x,y)}||\vec{v}|}{I_{std}(d)(\vec{n}_{(x,y)} \cdot \vec{v})}$$

wherein $I_{(x,y)}$ is the light intensity distribution; $\vec{n}_{(x,y)}$ is the unit normal vector; d is a depth from the face to the multi-lens camera; $I_{std}(d)$ is a standard brightness value of infrared light having a specified wavelength in case of a distance d, which is acquired though a pre-calibrated brightness-distance curve; $\vec{v}$ is the unit vector of parallel incident light; when the face is facing the multi-lens camera directly, the angle between $\vec{v}$ and the forehead plane is approximately $\pi/2$; $\gamma_{(x,y)}$ is the reflectivity distribution.

At Step 3, the infrared face region is divided into a plurality of organ regions, and reflectivity distribution histograms of the plurality of organ regions are determined based on the reflectivity distribution.

For example, the infrared face region is divided into five organ regions, such as, a forehead, eyes, a nose, cheeks, and lips, and the reflectivity distribution histogram in each organ region is calculated through statistics.

At Step 4, the reflectivity distribution histograms are converted into a multi-dimensional feature vector.

The detection system composes all the reflectivity distribution histograms into one multi-dimensional feature vector.

At Step 5, the multi-dimensional feature vector is analyzed through the pre-trained first classifier to obtain an infrared analysis result.

The step of pre-training the first classifier includes, acquiring the pre-trained first classifier by inputting the multi-dimensional feature vectors of multiple faces, as positive samples, into a deep learning-based classifier for training. Optionally, the first classifier may be an SVM classifier. The infrared analysis result is that the face is a living body or the face is a non-living body.

In the embodiment of this application, the depth image and the infrared image are used in combination. The unit normal vector of each point is acquired in the depth image of the face. Based on information such as the unit normal vector of each point and the infrared image, the face reflectivity distribution is calculated. Then the reflectivity distribution histograms of the plurality of organ regions are converted into the multi-dimensional feature vector. Attacks by means of prostheses can be effectively prevented through the SVM classifier, which increases the accuracy of living body face detection.

Optionally, the second image feature is an LBP (Local Binary Pattern), and the second deep learning model is a second classifier, wherein determining the second image feature of the RGB face region and analyzing the second image feature through the pre-trained second deep learning model to obtain the RGB analysis result includes:

At Step 1, an LBP feature of the RGB face region is extracted.

The detection system performs LBP feature extraction on the RGB face region in the RGB image to acquire the LBP feature of the RGB face region.

At Step 2, the LBP feature is analyzed through the pre-trained second classifier to obtain the RGB analysis result.

The step of pre-training the second classifier includes: acquiring the pre-trained second classifier by inputting the LBP feature, as positive samples, into the deep learning-based classifier for training. The RGB analysis result is that the face is a living body or the face is a non-living body.

The texture feature of a face reflects its reflectivity distribution, so the problem may be transformed into the recognition of the texture feature. In the embodiment of the present application, the reflectivity cues in the visible light band are effectively used, and the lighting robustness is enhanced, and the accuracy of living body face detection is improved by pre-extracting the LBP texture feature of the face region and using LBP images to train the neural network classifier for classification and recognition.

Figure 3:
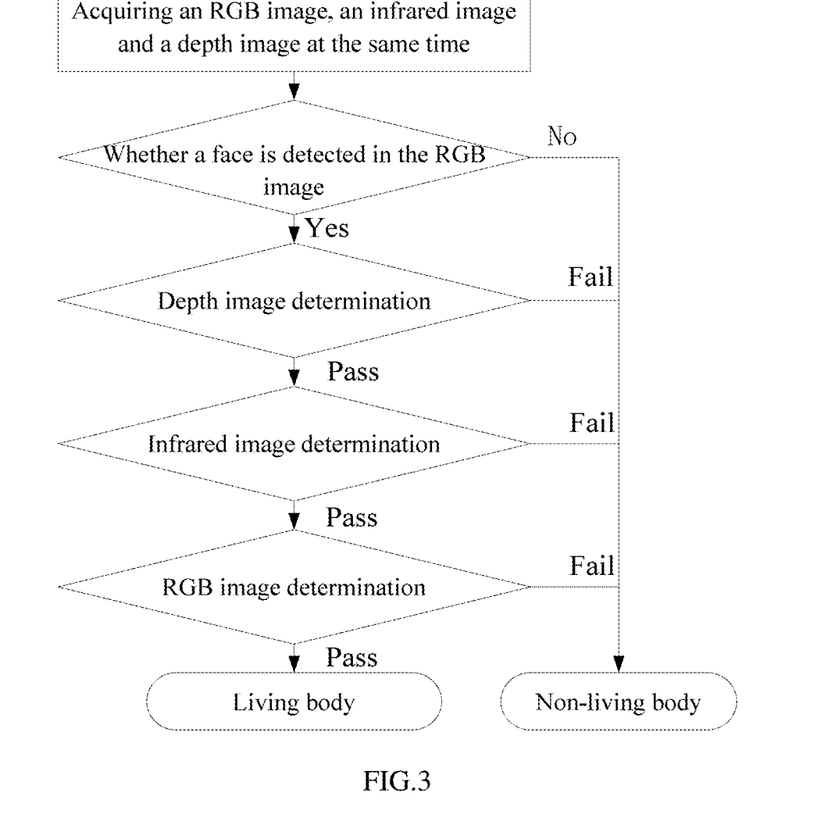
FIG. 3 is a third schematic flow chart of the anti-counterfeiting face detection method according to an embodiment of the present application.
Figure 4:
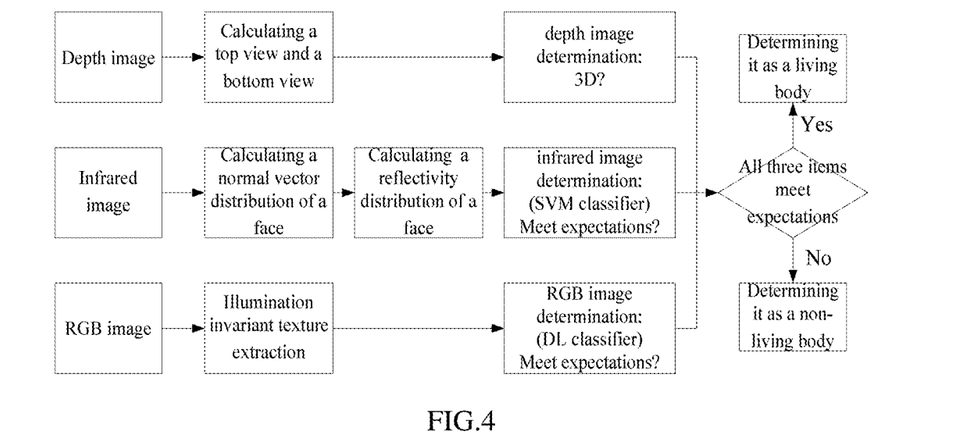
FIG. 4 is a fourth schematic flow chart of the anti-counterfeiting face detection method according to an embodiment of the present application.

The anti-counterfeiting face detection method in the embodiment of the present application may also be as shown in FIG. 3, wherein the determination process of the depth image, of the infrared image and of the RGB image may be as shown in FIG. 4.

The extrinsic parameters of the TOF camera and the RGB camera through binocular calibration are acquired. The following three images are acquired at the same time: an RGB image acquired by the RGB camera; a confidence image acquired by the TOF camera, that is, an infrared image; and a depth image acquired by the TOF camera.

On the RGB image, the face detection is performed through the face detection algorithm to acquire the position information of the face frame. If no face is detected, it is directly determined as a non-living body, and the process is ended.

Using the calibrated parameters, the position information of the face frame in the RGB image is projected onto the depth image, that is, the face region in the depth image is acquired. Based on the face region in the depth image, a conversion into a side view and a top view of the three-dimensional face is performed to determine the similarity between the face depth change curve and the priori template from these two viewing angles. If the similarity is greater than a preset threshold, it is marked that the depth image determination is passed; otherwise, it is directly determined as a non-living body, and the process is ended.

The unit normal vector $\vec{n}_{(x,y)}$ of each point in the face region is calculated based on the depth image. Since the plane coordinate of the infrared image and the plane coordinate of the depth image are coincident, the position of the face frame in the depth image is directly used to acquire the face region in the infrared image. The light intensity distribution $I_{(x,y)}$ of the face region, that is, the brightness value of each pixel in the face region is acquired from the infrared image. The reflectivity distribution $\gamma_{(x,y)}$ of the face region may be calculated according to the following formula:

$$\gamma_{(x,y)} = \frac{I_{(x,y)}}{I_{std}(d)\cos\langle\vec{n}_{(x,y)}, \vec{v}\rangle} = \frac{I_{(x,y)}|\vec{n}_{(x,y)}||\vec{v}|}{I_{std}(d)(\vec{n}_{(x,y)} \cdot \vec{v})}$$

wherein d is the depth from the face to the multi-lens camera; $I_{std}(d)$ is a standard brightness value of 940 nm infrared light in case of a distance d, which is acquired through a pre-calibrated brightness-distance curve; the illumination may be approximated as parallel light with a unit vector in the incident direction of $\vec{v}$, which forms an angle of approximate $\pi/2$ with the forehead plane when being directly faced by the face.

The face region is divided into five parts: a forehead, eyes, a nose, cheeks, and lips. The reflectivity distribution histogram in each region is calculated through statistics, and all the histograms are converted into a multi-dimensional feature vector. The feature vector is input into the SVM classifier based on the pre-trained SVM classifier. If the classification result indicates a living body, it is marked that the infrared image determination is passed; otherwise, it is directly determined as a non-living body, and the process is ended.

The LBP feature extraction is performed on the face region in the RGB image to acquire the LBP texture image. Through the pre-trained classifier (the classifier is based on deep learning training, and the input is the LBP feature image of the face image), it is determined whether the LBP texture image comes from a living body. If the LBP texture image comes from a living body, it is marked that the RGB image determination is passed; otherwise, it is directly determined as a non-living body, and the process is ended.

If all of the RGB image determination, the infrared image determination, and the depth image determination are passed, the final determination result indicates a living body.

In the embodiment of the present application, various valid information is fully utilized, and the accuracy of living body detection is guaranteed through three determinations. The RGB image determination, the infrared image determination, and the depth image determination respectively use the emissivity characteristic of the visible light band, the reflectivity characteristic of the infrared band, and the depth distribution characteristic of the face. If all the three aspects of characteristics meet the requirements of a living body face, then the detected object is finally determined as a living body.

Attack methods such as 2D photos and videos can be accurately and quickly prevented, especially attacks by means of distorted photos can be prevented, using depth information, which is not affected by the environment and is very robust. The reflectivity distribution of a living body face can be accurately described, and the ability for recognizing prostheses such as hole masks with rough materials and low processing accuracy, 3D (Dimensions) models and the like can be enhanced. Reflectivity characteristics of the visible light band can be effectively used, and combined with the accurate description of the reflectivity characteristics of the infrared band, the present application can reliably resist attacks by means of prostheses, such as various masks, 3D models and the like, and is robust in terms of illumination. This application belongs to living body anti-counterfeiting technology in the silent mode, which does not require an active interaction and is flexible and convenient.

Figure 5:
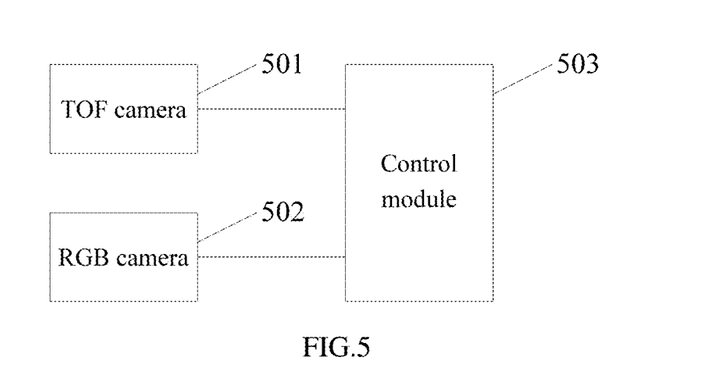
FIG. 5 is a schematic diagram of a multi-lens camera according to an embodiment of the present application.

An embodiment of the present application further provides a multi-lens camera. Referring to FIG. 5, the multi-lens camera includes:
 a TOF camera 501, an RGB camera 502 and a control module 503;
 the TOF camera 501 is configured for acquiring a depth image and an infrared image;
 the RGB camera 502 is configured for acquiring an RGB image; and
 the control module 503 is configured for: analyzing the RGB image through a preset face detection algorithm to determine an RGB face region of a face in the RGB image and position information of the RGB face region; determining a depth face region of the face in the depth image and an infrared face region of the face in the infrared image based on the position information of the RGB face region; and determining that the face passes the detection when the depth face region, the infrared face region and the RGB face region meet corresponding preset rules respectively.

Figure 6:
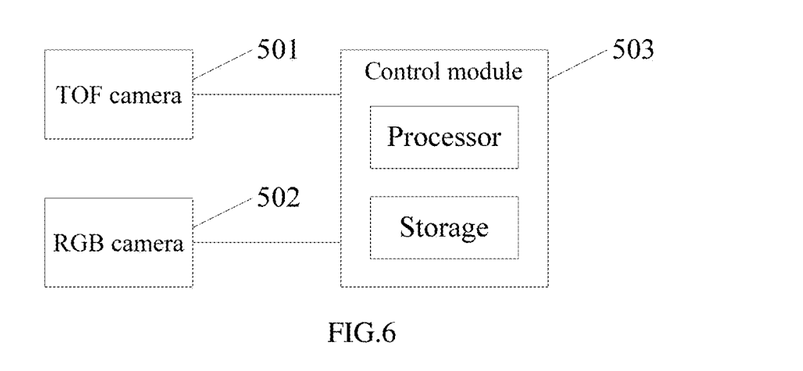
FIG. 6 is another schematic diagram of the multi-lens camera according to an embodiment of the present application.

Optionally, referring to FIG. 6, the control module 503 includes a processor and a memory. The memory is configured for storing data, and the processor is configured for implementing the following steps during operation: analyzing the RGB image through a preset face detection algorithm to determine an RGB face region of the face in the RGB image and position information of the RGB face region; determining a depth face region of the face in the depth image and an infrared face region of the face in the infrared image based on the position information of the RGB face region; and determining that the face passes the detection when the depth face region, the infrared face region and the RGB face region meet corresponding preset rules respectively.

In the embodiments of this application, it is determined whether the face is a living body by acquiring the depth image, the infrared image and the RGB image using the TOF camera and the RGB camera, the detection of a face of a living body can be completed without the cooperation of a user performing corresponding actions, which can save the detection time, and provide good user experience. Through the TOF camera and the RGB camera, information on object depth, infrared and visible light are acquired from three dimensions at the same time. When the depth face region, the infrared face region and the RGB face region meet their preset rules, the face is determined to pass the detection, and the detection success rate is high.

Optionally, the multi-lens camera may specifically be a binocular camera.

In the embodiment of the present application, the confidence image of the TOF camera of the binocular camera is used as the infrared grayscale image. A binocular camera only composed of a TOF camera and an RGB camera can acquire information on the object depth, the infrared, and the visible light from three dimensions at the same time, without requiring a camera with three-lens or more lens, which reduces the complexity of the device while ensuring the accuracy of detection.

Optionally, in the multi-lens camera of the embodiment of the present application, determining that the face passes the detection, when the depth face region, the infrared face region and the RGB face region meet corresponding preset rules respectively, includes:
 calculating a similarity between the depth face region and a reserved priori face template; determining a first image feature of the infrared face region, and analyzing the first image feature through a pre-trained first deep learning model to obtain an infrared analysis result; determining a second image feature of the RGB face region, and analyzing the second image feature through a pre-trained second deep learning model to obtain an RGB analysis result; determining that the face passes the detection, when the similarity is greater than a preset similarity threshold, the infrared analysis result indicates that the face is a living body, and the RGB analysis result indicates that the face is a living body.

Optionally, in the multi-lens camera of the embodiment of the present application, calculating the similarity between the depth face region and a reserved priori face template, includes:
 determining a side view and a top view of the face based on the depth face region; calculating a similarity between the face depth change curve of the side view and the face depth change curve of the top view and the face depth change curve of the reserved priori face template.

Optionally, in the multi-lens camera of the embodiment of the present application, the first image feature is a multi-dimensional feature vector, and the first deep learning model is a first classifier, wherein determining the first image feature of the infrared face region and analyzing the first image feature through the pre-trained first deep learning model to obtain the infrared analysis result includes:
 determining a light intensity distribution of the infrared face region and a unit normal vector of each point in the infrared face region; calculating a reflectivity distribution of the infrared face region based on the light intensity distribution and the unit normal vector of each point; dividing the infrared face region into a plurality of organ regions, and determining a reflectivity distribution histogram of each organ region based on the reflectivity distribution; converting the reflectivity distribution histograms into a multi-dimensional feature vector; analyzing the multi-dimensional feature vector through the pre-trained first classifier to obtain an infrared analysis result.

Optionally, in the multi-lens camera of the embodiment of the present application, the second image feature is an LBP (Local Binary Pattern) feature, and the second deep learning model is a second classifier, wherein determining the second image feature of the RGB face region and analyzing the second image feature through the pre-trained second deep learning model to obtain an RGB analysis result includes:

extracting the LBP feature of the RGB face region; and analyzing the LBP feature through the pre-trained second classifier to obtain the RGB analysis result.

Optionally, in the multi-lens camera of the embodiment of the present application, the light source of the TOF camera is infrared light with a wavelength of 940 nm.

Optionally, the resolution of the TOF camera may be 320×240 or higher. Optionally, the resolution of the RGB camera may be 640×480 or higher. The installation baseline distance between the TOF camera and the RGB camera is less than 2 cm.

Spectral imaging may combine various electromagnetic waves, such as the near-infrared band, the visible light band, and the ultraviolet band. Through the imaging technology and the spectral technology, a large number of continuous and narrow spectral continuous images can be acquired. Based on the spectral resolution, it is divided into multi-spectral ($\Delta\lambda/\lambda=0.1$), high-spectral ($\Delta\lambda/\lambda=0.01$), and hyper-spectral ($\Delta\lambda/\lambda=0.001$).

Figure 7:
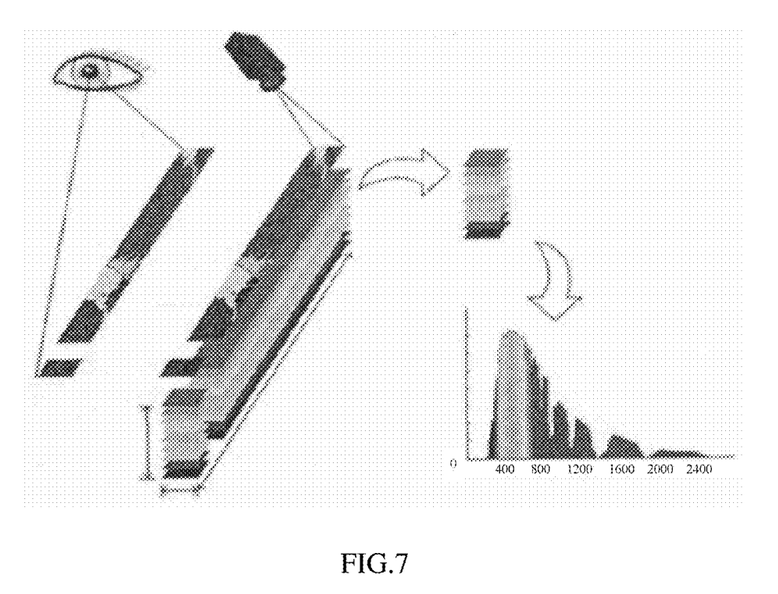
FIG. 7 is a schematic diagram of a high-spectral image in related art.

"Image-spectrum integration" is a remarkable feature of spectral imaging. In a general RGB image, there is only "image" but no "spectrum". There are many electromagnetic bands, but they cannot be reflected in the RGB image. The RGB image can only reflect the superimposition effect of imaging under a part of spectrum. The spectral image can effectively describe the spatial information, spectral information, and radiation energy of substances, which has good robustness to the classification and identification of substances. The specific image of the high-spectral image is shown in FIG. 7. It can be seen that the high-spectral image is actually a group of images, which form a data cube. From this data cube, not only a conventional two-dimensional image is acquired, but also spectral information is acquired by observing from another dimension.

Figure 8A:
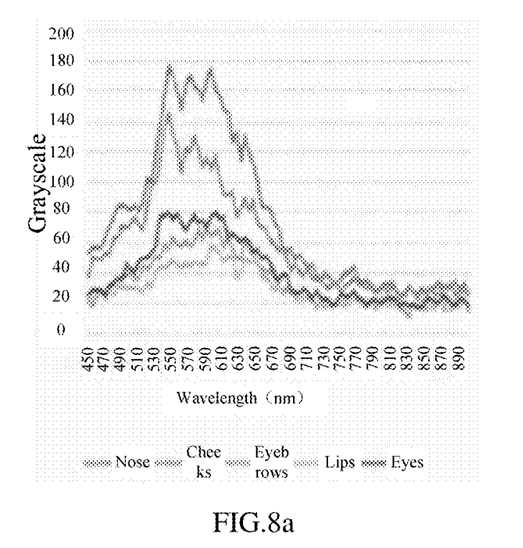
FIG. 8a is a grayscale image of a photo in various hyper-spectral sub-bands according to an embodiment of the present application.
Figure 8B:
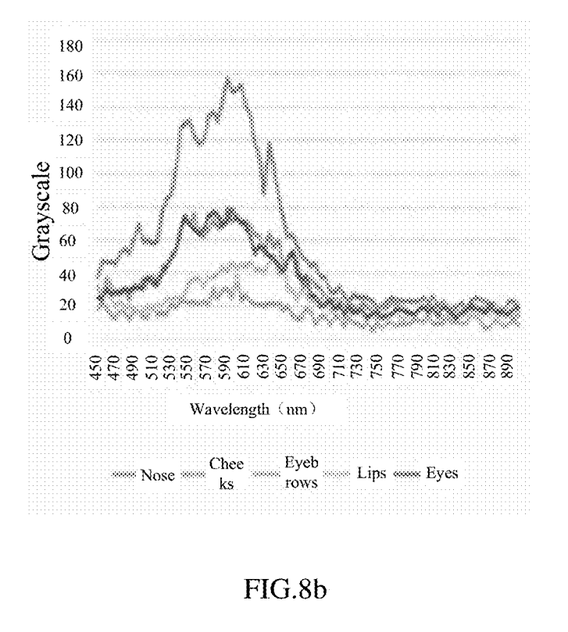
FIG. 8b is a grayscale image of a living body face in various hyper-spectral sub-bands according to an embodiment of the present application.

The applicant found in the research that for living body face detection, a living body can be clearly distinguished from a prosthesis by high-spectral imaging. See FIG. 8a and FIG. 8b, wherein FIG. 8a is a grayscale image of a photo in various hyper-spectral sub-bands, and FIG. 8b is a grayscale image of a living body face in various hyper-spectral sub-bands. It can be seen that under each high-spectral sub-band, the gray value of the photo and the gray value of the real person are quite different. Usually, a photo and a real people basically look the same when seen by the human eyes, this is because a plurality of sub-bands are superimposed together, which causes a result of no discrimination. High-spectral technology, like a "microscope", can use images under various sub-bands and compare them separately, and there are always discriminations in some sub-bands.

However, in order to acquire an image similar to the plurality of high-spectral sub-bands, the requirements for a device are very high. Therefore, it is necessary to detect a living body face using the principle of spectral analysis. One of the core problems is to select sub-bands with the optimal discrimination, and fewer sub-bands are preferable as long as discrimination is guaranteed. The applicant found in the research that the combination of RGB and IR (Infrared Radiation) with a wavelength of 940 nm has sufficient discrimination for the application of living body face detection. While, for pure RGB and pure IR bands, the discrimination is relatively limited. Therefore, the TOF confidence image of the 940 nm wavelength (that is, the infrared image in the IR band) can be used, and combined with the RGB camera, to realize the multi-spectral detection of the face.

The current three mainstream depth perception technologies include a binocular vision, a structured light, and a TOF. Wherein the main advantages of the TOF lie in a small size and high accuracy. The object depth information and the confidence image (equivalent to infrared grayscale image) can be acquired through a monocular camera.

Figure 9:
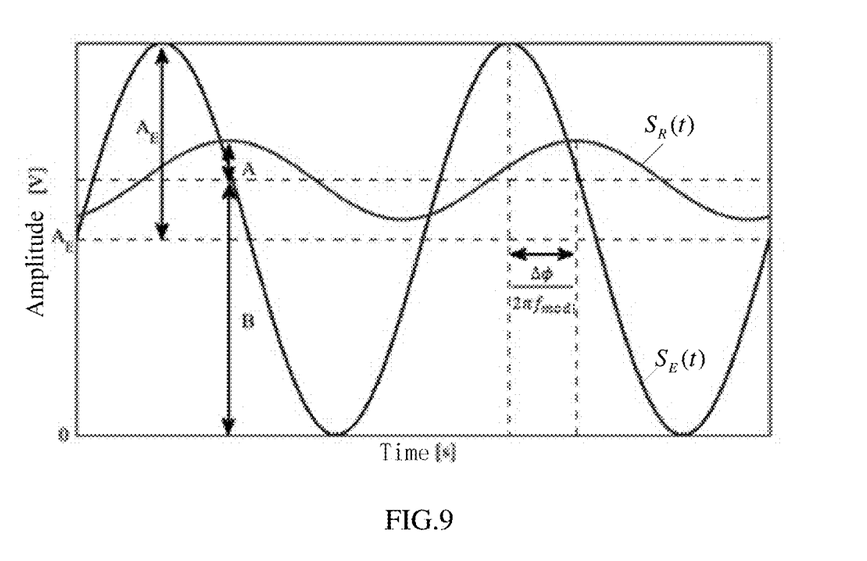
FIG. 9 is a schematic diagram illustrating the principle of a continuous wave ranging method in related art.

The basic principle of TOF technology is similar to radar ranging. Simply to say, the object distance can be calculated by measuring the round-trip flight time of the photon from launch to return in combination with the speed of light. In order to measure the entire scene surface, unlike scanning laser lidar, the TOF integrates many point sensors on an array surface to form a matrix. In this way, by taking a picture of a scene through the matrix TOF, the surface geometry information of the entire scene can be acquired in real time. Therefore, a TOF sensor is also used as a solid-state laser lidar in some places. Typical TOF methods include a continuous wave ranging method, a pulsed light direct measurement method, and a distance threshold method, wherein the continuous wave ranging method is shown in FIG. 9, and the test result is obtained according to the following formula.

$$\rho = \frac{c}{4\pi f_{mod}}\Delta\phi$$

Wherein, $\rho$ is a ranging result, c is the speed of light, $$\frac{\Delta\phi}{2\pi f_{mod}}$$

is the round trip time ($\Delta\phi$ is a phase difference, $f_{mod}$ is a modulation frequency). Based on "distance=speed of light*round trip time/2", the above distance calculation formula can be obtained.

Figure 10:
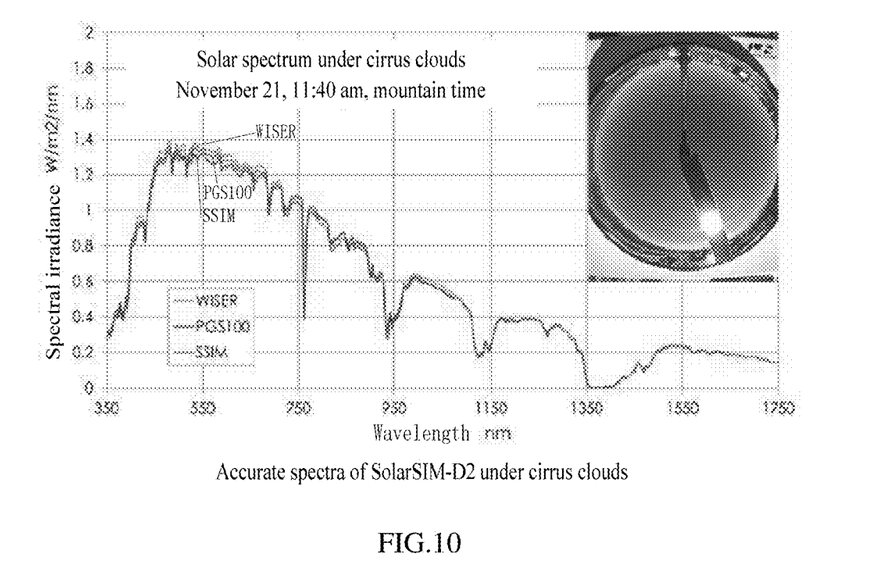
FIG. 10 is a schematic diagram of natural light spectrum in related art.

In the embodiment of the present application, the infrared light and the sensor use the 940 nm band, which is mainly because relative less light in 940 nm bands is contained in the natural light. The natural light spectrum is shown in FIG. 10 below. It can be seen that the 940 nm band is just in the range of a valley. The advantage lies in that the 940 nm light wave acquired by the camera mainly comes from the fill light, with controllable brightness and basically not affected by ambient light. Therefore, the reflectivity can be calculated using a calibrated brightness-distance curve in advance.

Figure 11:
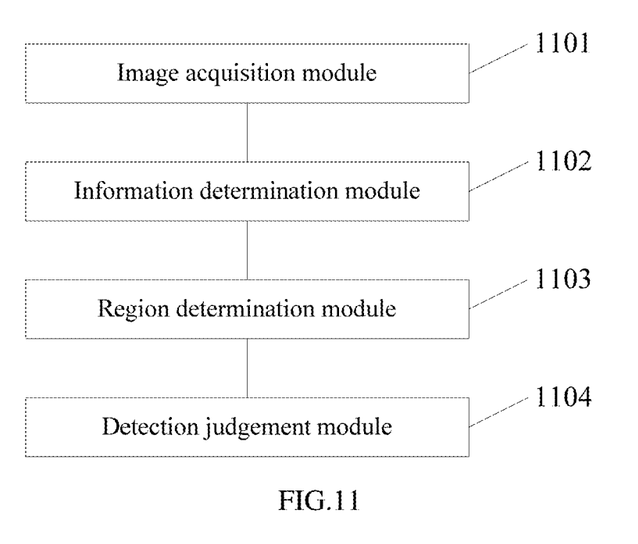
FIG. 11 is a schematic diagram of an anti-counterfeiting face detection device according to an embodiment of the present application.

An embodiment of the present application provides an anti-counterfeiting face detection device (see FIG. 11), which is located in a multi-lens camera, including a TOF camera and an RGB camera. The device includes:

an image acquisition module 1101 configured for acquiring a depth image, an infrared image and an RGB image by using the TOF camera and the RGB camera;

an information determination module 1102 configured for analyzing the RGB image through a preset face detection algorithm to determine an RGB face region of a face in the RGB image and position information of the RGB face region;

a region determination module 1103 configured for determining a depth face region of the face in the depth image and an infrared face region of the face in the infrared image based on the position information of the RGB face region; and a detection judgement module 1104 configured for determining that the face passes the detection when the depth face region, the infrared face region and the RGB face region meet corresponding preset rules respectively.

Optionally, the detection judgement module 1104 includes:

a similarity calculation sub-module configured for calculating the similarity between the depth face region and a reserved priori face template;

an infrared analysis sub-module configured for determining a first image feature of the infrared face region, and analyzing the first image feature through a pre-trained first deep learning model to obtain an infrared analysis result;

an RGB analysis sub-module configured for determining a second image feature of the RGB face region, and analyzing the second image feature through a pre-trained second deep learning model to obtain an RGB analysis result; and a comprehensive analysis sub-module configured for determining that the face passes the detection, when the similarity is greater than a preset similarity threshold, the infrared analysis result indicates that the face is a living body, and the RGB analysis result indicates that the face is a living body.

Optionally, the similarity calculation sub-module includes:

a view determination unit, which is configured for determining a side view and a top view of the face based on the depth face region; and a depth comparison unit, which is configured for comparing a face depth change curve of the side view and a face depth change curve of a top view with the face depth change curve of the reserved priori face template to determine the similarity between the depth face region and the reserved priori face template.

Optionally, the first image feature is a multi-dimensional feature vector, and the first deep learning model is a first classifier. The infrared analysis sub-module includes:

a normal vector determination unit configured for determining a light intensity distribution of the infrared face region and a unit normal vector of each point in the infrared face region;

a reflectivity determination unit configured for calculating a reflectivity distribution of the infrared face region based on the light intensity distribution and the unit normal vector of each point;

a histogram determination unit configured for dividing the infrared face region into a plurality of organ regions, and determining reflectivity distribution histograms of the plurality of organ regions based on the reflectivity distribution;

a feature vector determination unit configured for converting the reflectivity distribution histograms into a multi-dimensional feature vector; and an infrared result determination unit configured for analyzing the multi-dimensional feature vector through the pre-trained first classifier to obtain an infrared analysis result.

Optionally, the second image feature is a local binary pattern LBP feature, and the second deep learning model is a second classifier. The RGB analysis sub-module includes:

an LBP feature extraction unit configured for extracting the LBP feature of the RGB face region; and an RGB result determination unit configured for analyzing the LBP feature through the pre-trained second classifier to obtain the RGB analysis result.

The memory may include a Random Access Memory (RAM), or may include a Non-Volatile Memory (NVM), for example at least one disk memory. Optionally, the memory may also be at least one storage device remote from the processor described above.

The processor may be a general-purpose processor, such as a Central Processing Unit (CPU), a Network Processor (NP), or the like; the processor may also be a Digital Signal Processor (DSP), an Application Specific Integrated Circuit (ASIC), a Field-Programmable Gate Array (FPGA) or other programmable logic device, a discrete gate or transistor logic device, a discrete hardware component.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices including a series of elements include not only those elements listed but also those not specifically listed or the elements intrinsic to these processes, methods, articles, or devices. Without further limitations, elements defined by the sentences "comprise(s)" or "include(s)" do not exclude that there are other identical elements in the processes, methods, articles, or devices which include these elements.

All the embodiments in the description are described in a correlated manner, same or similar parts in various embodiments can be referred to one another, and the parts emphasized are differences to other embodiments. For the similarities, please refer to the part of the description of the method embodiment.

The embodiments described above are merely preferred embodiments of the present application, and not intended to limit the scope of the present application. Any modifications, equivalents, improvements or the like within the spirit and principle of the application should be included in the scope of the application.

What is claimed is:

1. An anti-counterfeiting face detection method, which is applied to a multi-lens camera comprising a Time-Of-Flight (TOF) camera and a Red-Green-Blue (RGB) camera, and comprises:

acquiring a depth image, an infrared image and an RGB image by using the TOF camera and the RGB camera;

analyzing the RGB image through a preset face detection algorithm to determine an RGB face region of a face in the RGB image and position information of the RGB face region;

determining a depth face region of the face in the depth image and an infrared face region of the face in the infrared image based on the position information of the RGB face region; and determining that the face passes the detection when the depth face region, the infrared face region and the RGB face region meet corresponding preset rules respectively;

wherein determining that the face passes the detection when the depth face region, the infrared face region and the RGB face region meet corresponding preset rules respectively, comprises:

calculating a similarity between the depth face region and a reserved priori face template;

determining a first image feature of the infrared face region, and analyzing the first image feature through a pre-trained first deep learning model to obtain an infrared analysis result;

determining a second image feature of the RGB face region, and analyzing the second image feature through a pre-trained second deep learning model to obtain an RGB analysis result; and determining that the face passes the detection, when the similarity is greater than a preset similarity threshold, the infrared analysis result indicates that the face is a living body, and the RGB analysis result indicates that the face is a living body;

wherein calculating the similarity between the depth face region and the reserved priori face template comprises:

determining a side view and a top view of the face based on the depth face region; and comparing a face depth change curve of the side view and a face depth change curve of the top view with a face depth change curve of the reserved priori face template to determine the similarity between the depth face region and the reserved priori face template.

2. The method according to claim 1, wherein the first image feature is a multi-dimensional feature vector, and the first deep learning model is a first classifier, wherein determining the first image feature of the infrared face region and analyzing the first image feature through the pre-trained first deep learning model to obtain the infrared analysis result comprises:

determining a light intensity distribution of the infrared face region and a unit normal vector of each point in the infrared face region;

calculating a reflectivity distribution of the infrared face region based on the light intensity distribution and the unit normal vector of each point;

dividing the infrared face region into a plurality of organ regions, and determining reflectivity distribution histograms of the plurality of organ regions based on the reflectivity distribution;

converting the reflectivity distribution histograms into a multi-dimensional feature vector; and analyzing the multi-dimensional feature vector through the pre-trained first classifier to obtain the infrared analysis result.

3. The method according to claim 1, wherein the second image feature is a Local Binary Pattern (LBP) feature, and the second deep learning model is a second classifier, wherein determining the second image feature of the RGB face region and analyzing the second image feature through the pre-trained second deep learning model to obtain the RGB analysis result comprises:

extracting the LBP feature of the RGB face region; and analyzing the LBP feature through the pre-trained second classifier to obtain the RGB analysis result.

4. A multi-lens camera, comprising:

a TOF camera, an RGB camera and a control module;

the TOF camera is configured for acquiring a depth image and an infrared image;

the RGB camera is configured for acquiring an RGB image; and the control module is configured for analyzing the RGB image through a preset face detection algorithm to determine an RGB face region of a face in the RGB image and position information of the RGB face region; determining a depth face region of the face in the depth image and an infrared face region of the face in the infrared image based on the position information of the RGB face region; and determining that the face passes the detection when the depth face region, the infrared face region and the RGB face region meet corresponding preset rules respectively;

wherein determining that the face passes the detection when the depth face region, the infrared face region and the RGB face region meet corresponding preset rules respectively, comprises:

calculating a similarity between the depth face region and a reserved priori face template;

determining a first image feature of the infrared face region, and analyzing the first image feature through a pre-trained first deep learning model to obtain an infrared analysis result;

determining a second image feature of the RGB face region, and analyzing the second image feature through a pre-trained second deep learning model to obtain an RGB analysis result; and determining that the face passes the detection, when the similarity is greater than a preset similarity threshold, the infrared analysis result indicates that the face is a living body, and the RGB analysis result indicates that the face is a living body;

wherein calculating the similarity between the depth face region and the reserved priori face template comprises:

determining a side view and a top view of the face based on the depth face region; and calculating a similarity between a face depth change curve of the side view and a face depth change curve of the top view and face depth change curve of the reserved priori face template.

5. The multi-lens camera according to claim 4, wherein the first image feature is a multi-dimensional feature vector, and the first deep learning model is a first classifier, wherein determining the first image feature of the infrared face region and analyzing the first image feature through the pre-trained first deep learning model to obtain the infrared analysis result comprises:

determining a light intensity distribution of the infrared face region and a unit normal vector of each point in the infrared face region;

calculating a reflectivity distribution of the infrared face region based on the light intensity distribution and the unit normal vector of each point;

dividing the infrared face region into a plurality of organ regions, and determining reflectivity distribution histograms of the plurality of organ regions based on the reflectivity distribution;

converting the reflectivity distribution histograms into a multi-dimensional feature vector; and analyzing the multi-dimensional feature vector through the pre-trained first classifier to obtain the infrared analysis result.

6. The multi-lens camera according to claim 4, wherein the second image feature is an LBP feature, and the second deep learning model is a second classifier, wherein determining the second image feature of the RGB face region and analyzing the second image feature through the pre-trained second deep learning model to obtain the RGB analysis result comprises:

extracting the LBP feature of the RGB face region; and analyzing the LBP feature through the pre-trained second classifier to obtain the RGB analysis result.

7. The multi-lens camera according to claim 4, wherein a light source of the TOF camera is infrared light with a wavelength of 940 nm.

8. An anti-counterfeiting face detection device, which is located in a multi-lens camera comprising a TOF camera and an RGB camera, and comprises:
- an image acquisition module configured for acquiring a depth image, an infrared image and an RGB image by using the TOF camera and the RGB camera;
- an information determination module configured for analyzing the RGB image through a preset face detection algorithm to determine an RGB face region of a face in the RGB image and position information of the RGB face region;
- a region determination module configured for determining a depth face region of the face in the depth image and an infrared face region of the face in the infrared image based on the position information of the RGB face region; and
- a detection judgement module configured for determining that the face passes the detection when the depth face region, the infrared face region and the RGB face region meet corresponding preset rules respectively;
- wherein determining that the face passes the detection when the depth face region, the infrared face region and the RGB face region meet corresponding preset rules respectively, comprises:
- calculating a similarity between the depth face region and a reserved priori face template;
- determining a first image feature of the infrared face region, and analyzing the first image feature through a pre-trained first deep learning model to obtain an infrared analysis result;
- determining a second image feature of the RGB face region, and analyzing the second image feature through a pre-trained second deep learning model to obtain an RGB analysis result; and
- determining that the face passes the detection, when the similarity is greater than a preset similarity threshold, the infrared analysis result indicates that the face is a living body, and the RGB analysis result indicates that the face is a living body;
- wherein calculating the similarity between the depth face region and the reserved priori face template comprises:
- determining a side view and a top view of the face based on the depth face region; and
- comparing a face depth change curve of the side view and a face depth change curve of the top view with a face depth change curve of the reserved priori face template to determine the similarity between the depth face region and the reserved priori face template.

* * * * *